United States Patent [19]

Charrier

[11] Patent Number: 4,606,189

[45] Date of Patent: Aug. 19, 1986

[54] FUEL CONTROL

[75] Inventor: Michael G. Charrier, Cincinnati, Ohio

[73] Assignee: General Electric Company, Cincinnati, Ohio

[21] Appl. No.: 594,627

[22] Filed: Mar. 29, 1984

[51] Int. Cl.$^4$ .............................................. F02C 9/28
[52] U.S. Cl. .................................. 60/39.03; 60/39.281
[58] Field of Search ............. 60/39.03, 39.07, 39.142, 60/39.27, 39.281, 39.29

[56] References Cited

U.S. PATENT DOCUMENTS

| | | | |
|---|---|---|---|
| 3,426,527 | 2/1969 | O'Connor | 60/39.14 |
| 3,844,112 | 10/1974 | Harrison | 60/39.14 |
| 3,918,254 | 11/1975 | Wernberg | 60/39.28 R |
| 4,186,556 | 2/1980 | Lowry et al. | 60/39.27 |
| 4,444,008 | 4/1984 | Cartwell | 60/39.281 |

Primary Examiner—Louis J. Casaregola
Attorney, Agent, or Firm—Gregory A. Welte; Derek P. Lawrence

[57] ABSTRACT

The present invention concerns a fuel control for a gas turbine aircraft engine. The control de-riches fuel-air mixture during ground start-ups in order to reduce a temperature within the engine.

4 Claims, 2 Drawing Figures

FUEL CONTROL

The present invention relates to fuel controls for gas turbine engines and, more particularly, to apparatus for de-riching the fuel flow in gas turbine aircraft engines during ground starts.

BACKGROUND OF THE INVENTION

The rate of fuel delivery in a gas turbine aircraft engine is scheduled according to selected engine parameters, such as selected pressures, temperatures, and speeds of engine components. However, the engine performance changes with time: the engine "deteriorates." As a result, the original fuel schedule may become non-optimal as time progresses.

Further, in some instances, it is impossible to predict in detail the exact performance which an engine will exhibit under a given fuel schedule.

As an example, the original fuel schedule for a particular gas turbine engine can cause an unexpectedly high temperature in the low pressure turbine stage. It is desirable to alleviate this temperature problem, and to do so without alteration of the original fuel schedule.

OBJECTS OF THE INVENTION

It is an object of the invention to provide a new and improved fuel control.

SUMMARY OF THE INVENTION

In one form of the present invention, a source of pressure is connected to a line which carries a pressure signal to which a fuel scheduling control responds. This connection raises the pressure in the line, thus inducing the control to decrease fuel-air ratio.

DETAILED DESCRIPTION OF THE INVENTION

Figure 1:
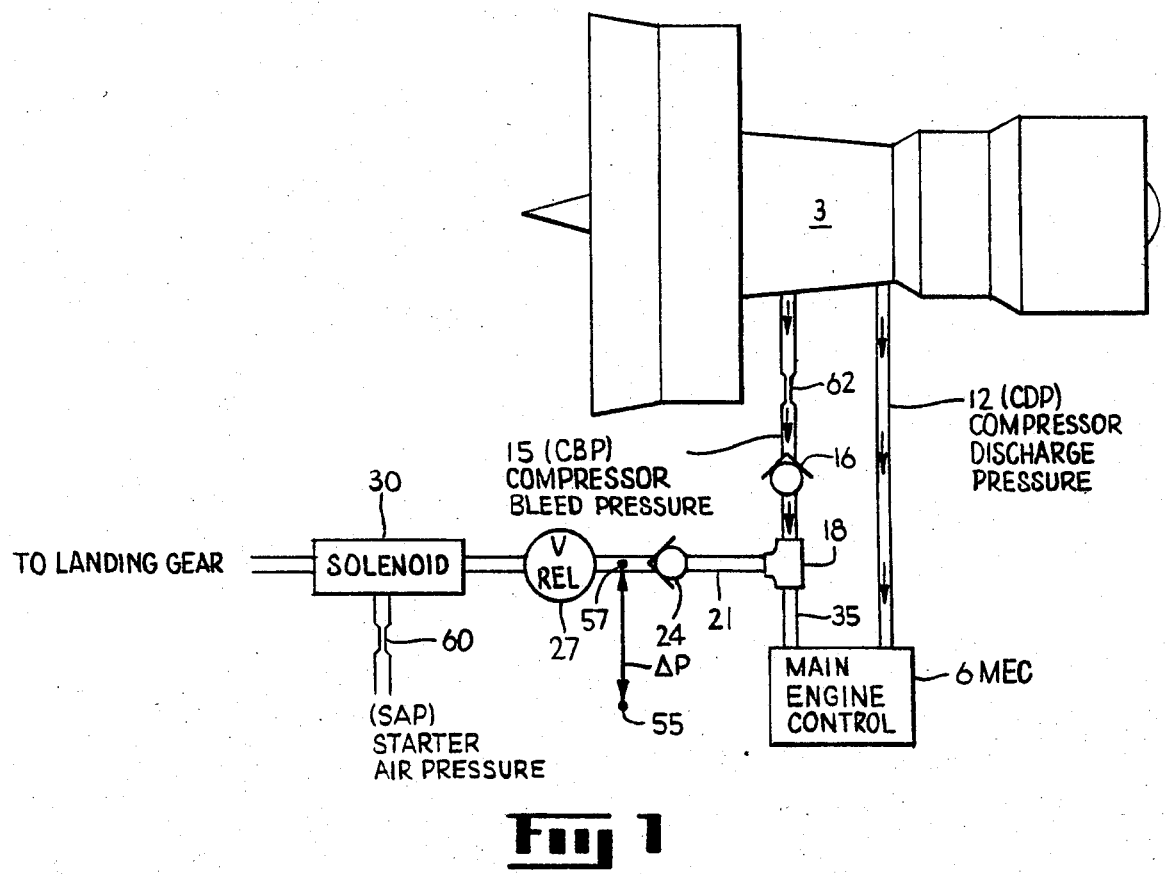
FIG. 1 illustrates one form of the present invention.

FIG. 1 illustrates a gas turbine engine 3 and an associated main engine control (MEC) 6. The MEC receives signals indicative of the pressure, temperature, or rotational speed of one or more engine components, and two of these signals are indicated as traveling along lines 12 and 15. One of the signals is a compressor discharge pressure (CDP) signal in line 12 and the other is a compressor bleed pressure (CBP) signal in line 15 which indicates a compressor bleed level. A check valve 16 in the CBP line 15 prevents flow toward the engine.

A T-connection or tap 18 is made in the CBP line 15 downstream of the check valve 16. The tap 18 connects the CBP line to a line 21 which leads through a check valve 24, a relief valve 27, and through a solenoid 30, thereby allowing a connection to be made between the CBP line 15 and a source of starter air pressure SAP. The solenoid 30 is connected to a sensor (not shown) which senses the fact that the aircraft's landing gear is down and, in such a case, opens the solenoid 30 so that a connection is made between T-connnection 18 and SAP.

The operation of the present invention is as follows. Starter air pressure is applied to the starter (not specifically shown) of the engine 3 by ducts (not shown), as known in the art, to thereby set both the starter and one of the turbines into rotation. Several sources of SAP are commonly used, including bottled air, an auxiliary power unit which is carried aboard the aircraft, or a mobile ground power unit. If the landing gear is down, solenoid 30 provides a fluidic connection between SAP and the CBP line 15, thereby adding the SAP pressure to the CBP pressure, thus increasing the pressure at point 35.

The MEC is programmed, as known in the art, such that when the ratio of CBP/CDP is less than unity, the MEC enriches the fuel flow and, conversely, when this ratio is greater than unity, the MEC de-riches fuel flow. The present invention artificially increases CBP at point 35 by adding SAP at the T-junction 18 to thereby make the CBP/CDP ratio greater than unity at a selected engine speed. Thus, the MEC is induced to de-rich (or lean out) the fuel-air mixture. The de-riching will, in some types of engines, reduce low pressure turbine temperature, thus reducing the possibility of high temperature damage. This artificial increase of CBP is only allowed to occur during ground starts because solenoid 30 disconnects SAP from the CBP line when the landing gear of the aircraft is up. The check valve 24 serves to prevent the pressure in line 21 from dropping below CBP when the SAP is below CBP; it prevents flow out of the CBP line toward the solenoid 30. Thus, when starter air pressure is terminated, the present invention has no influence on the pressure in line 21.

Figure 2:
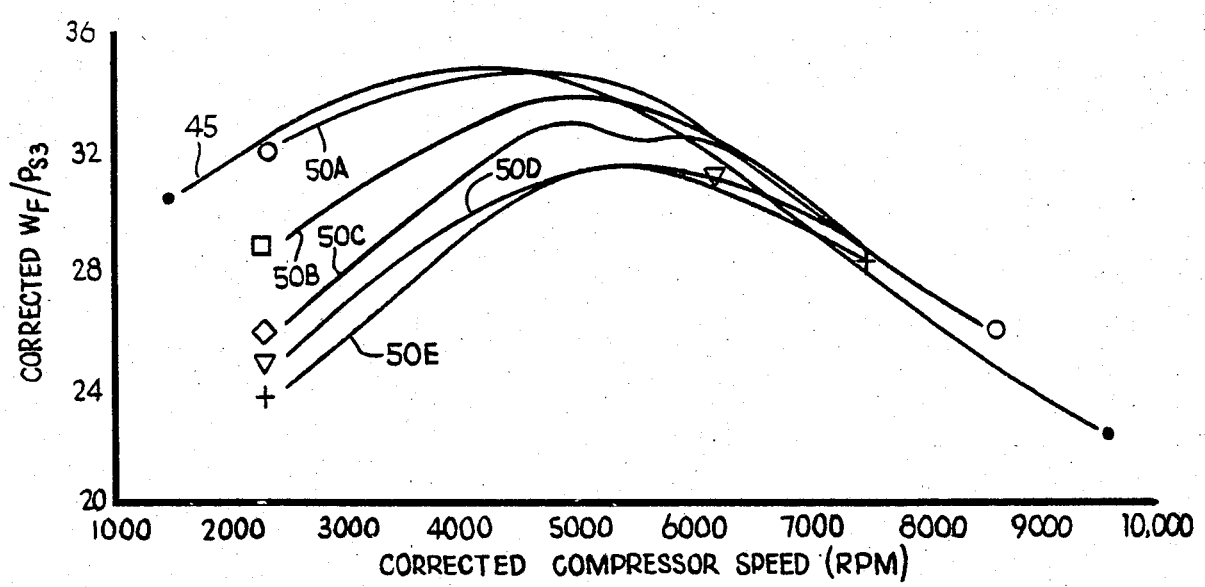
FIG. 2 illustrates different performances of a gas turbine engine operating with different forms of the present invention.

The present invention was installed on a gas turbine of the CFM56 family and test results are shown in FIG. 2. In that figure, fuel flow $P_{s3}$ is plotted on the vertical axis and engine core speed is plotted on the horizontal axis. $P_{s3}$ is the pressure at the ninth compressor stage and is customarily referred to as CDP. Line 45 illustrates the fuel flow as originally programmed into the MEC 6 of FIG. 1. Line 50A illustrates actual, empirically measured fuel flow, but without the present invention. Lines 50B–E illustrate the changed fuel flows induced by the present invention, for different settings of relief valve 27 in FIG. 1. Lines 50B–E in FIG. 2 indicate respectively relief valve settings of 10, 13, 15, and 17 psig. These settings refer to the pressure which the relief valve 27 in FiG. 1 ports to the CBP line. The relief valve 27 is constructed that so that the relief valve pressure (10, 13, 15 or 17 psig) is added to ambient, reference pressure. That is, the pressure difference between points 55 and 57 (as shown by the symbol $\Delta P$ in FIG. 1) is one of the 10, 13, 15, 17 psig values just mentioned. The pressure at point 55 is ambient pressure. CDP is raised in pressure accordingly.

The reader will note that the influence of the present invention upon fuel flow decreases at approximately 5–6,000 rpm as shown by the approximate merger of lines 50B–E with the empirical line 50A at those speeds. One reason for this is that CDP increases with speed, thus decreasing the ratio CBP/CDP as a function of speed. Also, SAP is reduced and terminated when speed becomes sufficiently great, thus reducing $\Delta P$ to zero.

Restrictions 60 and 62 inhibit pressure loss in the event of a line failure.

An invention has been described wherein one of the pressure signals which is fed to the fuel control in a gas turbine engine is artificially increased during ground startup of the engine. The increase causes the fuel control to de-rich the fuel-air ratio of the engine, thereby reducing the temperature of the low pressure turbine. The artificial increase of the pressure is induced by connecting the line containing the pressure to the source of starter air pressure which is used to start the engine. A solenoid allows this connection only when landing gear is down, as when the aircraft is on the ground. A check valve 24 prevents this connection when starter air pressure is turned off, as well as when the starter air pressure is below the pressure in the line. The amount of pressure added to the control line (i.e., ΔP) is determined by a relief valve. ΔPs of 10, 13, 15, and 17 psig have been used.

Numerous substitutions and modifications can be undertaken without departing from the true spirit and scope of the present invention. What is desired to be secured by Letters Patent is the invention as defined in the following claims.

I claim:

1. In a gas turbine engine control which responds to a compressor discharge pressure (CDP) and a compressor bleed pressure (CBP), the improvement comprising:
   (a) sensing means for sensing whether the aircraft is on the ground and
   (b) means coupled to the sensing means for artificially increasing the ratio of CBP/CDP which is sensed by the control, during engine startup, while the aircraft is on the ground.

2. A control for controlling a gas turbine aircraft engine, comprising:
   (a) a CDP line for transmitting a signal to the control indicative of a Compressor Discharge Pressure;
   (b) a CBP line for transmitting a signal to the control indicative of a Compressor Bleed Pressure;
   (c) a first check valve means for inhibiting fluid flow toward the engine in the CBP line;
   (d) a solenoid valve means for coupling a source of air pressure to the CBP line at a tap which is downstream of the first check valve;
   (e) sensing means coupled to the solenoid valve means for sensing whether the landing gear of the aircraft is down and, in response, signalling the solenoid valve means;
   (f) a relief valve interconnected between the solenoid valve means and the tap of (d) for limiting the pressure in the CBP line in the region of the tap to a predetermined value with respect to a selected reference; and
   (g) a second check valve means for preventing flow out of the CBP line toward the solenoid valve means when pressure in the CBP line exceeds pressure of the source of (d);

wherein the control reads a different CBP pressure than actually exists during ground starts of the engine and is thereby induced to de-rich fuel-air ratio below that which would be supplied if the actual CBP were read.

3. A method of altering the fuel-air ratio which a gas turbine engine control delivers to a gas turbine engine, comprising the following steps:
   (a) sensing whether the aircraft is on the ground;
   (b) artificially increasing a compressor bleed pressure which is sensed by the control.

4. In a gas turbine aircraft engine to which fuel delivery is controlled by a control which in turn responds to a compressor discharge pressure (CDP) and a compressor bleed pressure (CBP), a method of modifying the ratio between fuel flow rate and a compressor discharge pressure, comprising the following steps:
   (a) sensing whether the aircraft landing gear is down and, if the gear is down, porting starter air pressure (SAP) to a line carrying a CBP signal to the engine control;
   (b) limiting the starter air pressure which is ported to the CPB line to a predetermined excess above ambient pressure; and
   (c) preventing the application of SAP to the engine; whereupon the control is induced to de-rich the fuel-air mixture delivered to the engine.

* * * * *